(12) United States Patent
Yang et al.

(10) Patent No.: US 10,240,583 B2
(45) Date of Patent: Mar. 26, 2019

(54) CONTROL METHOD AND CONTROL APPARATUS OF WIND POWER GENERATOR SET

(71) Applicant: CSIC HAIZHUANG WINDPOWER CO., LTD., Chongqing (CN)

(72) Inventors: Wei Yang, Chongqing (CN); Fen Tao, Chongqing (CN); Jie Liu, Chongqing (CN); Maoshi Wen, Chongqing (CN); Youchuan Tao, Chongqing (CN); Yanni Yang, Chongqing (CN)

(73) Assignee: CSIC HAIZHUANG WINDPOWER CO., LTD., Chongqing (CN)

( * ) Notice: Subject to any disclaimer, the term of this patent is extended or adjusted under 35 U.S.C. 154(b) by 0 days.

(21) Appl. No.: 15/532,279

(22) PCT Filed: Feb. 29, 2016

(86) PCT No.: PCT/CN2016/074828
§ 371 (c)(1),
(2) Date: Jun. 1, 2017

(87) PCT Pub. No.: WO2017/088315
PCT Pub. Date: Jun. 1, 2017

(65) Prior Publication Data
US 2017/0268487 A1 Sep. 21, 2017

(30) Foreign Application Priority Data
Nov. 27, 2015 (CN) .......................... 2015 1 0848517

(51) Int. Cl.
*F03D 7/02* (2006.01)
*F03D 7/04* (2006.01)
*G05B 19/048* (2006.01)

(52) U.S. Cl.
CPC ............. *F03D 7/0276* (2013.01); *F03D 7/04* (2013.01); *F03D 7/042* (2013.01); *G05B 19/048* (2013.01);
(Continued)

(58) Field of Classification Search
CPC .......... F03D 7/0276; F03D 7/042; F03D 7/04; G05B 19/048; G05B 2219/2619;
(Continued)

(56) References Cited

U.S. PATENT DOCUMENTS

2010/0135789 A1  6/2010  Zheng et al.
2010/0283245 A1* 11/2010  Gjerlov ................. F03D 7/0224
                                                        290/44

(Continued)

FOREIGN PATENT DOCUMENTS

CN   102032109 A   4/2011
CN   102251926 A   11/2011
(Continued)

OTHER PUBLICATIONS

International Search Report for PCT/CN2016/074828, dated Sep. 6, 2016, ISA/CN.
(Continued)

*Primary Examiner* — Ziaul Karim
(74) *Attorney, Agent, or Firm* — U.S. Fairsky LLP; Yue(Robert) Xu

(57) ABSTRACT

A control method and a control apparatus of a wind power generator set are provided, in which a wind speed at a location of the wind power generator set is acquired, turbulence intensity is calculated according to the wind speed, and a wind speed distribution range corresponding to the turbulence intensity is determined; a thrust variation amplitude of the thrust in the wind speed distribution range is determined based on a relationship among the thrust suffered by a wind
(Continued)

wheel of the wind power generator set, a thrust coefficient and the wind speed; and a maximum rotating speed and a maximum torque of the wind wheel in the wind speed distribution range are adjusted according to the thrust variation amplitude. The maximum rotating speed and the maximum torque makes a fatigue load of the wind power generator set in the wind speed distribution range meet a preset standard.

8 Claims, 4 Drawing Sheets

(52) U.S. Cl.
CPC ..... *F05B 2270/101* (2013.01); *F05B 2270/32* (2013.01); *F05B 2270/322* (2013.01); *G05B 2219/2619* (2013.01); *Y02E 10/723* (2013.01)

(58) Field of Classification Search
CPC ............. Y02E 10/723; F05B 2270/322; F05B 2270/101; F05B 2270/32
USPC .................................................. 700/287–297
See application file for complete search history.

(56) References Cited

U.S. PATENT DOCUMENTS

| | | | | |
|---|---|---|---|---|
| 2011/0084485 | A1* | 4/2011 | Miranda | F03D 7/0224 290/44 |
| 2013/0025352 | A1* | 1/2013 | Teres Teres | F03D 7/0224 73/112.01 |
| 2013/0181450 | A1* | 7/2013 | Narayana | F03D 7/02 290/44 |
| 2013/0297085 | A1* | 11/2013 | Xiongzhe | F03D 7/0276 700/287 |
| 2014/0035285 | A1 | 2/2014 | Creaby et al. | |

FOREIGN PATENT DOCUMENTS

| | | |
|---|---|---|
| CN | 102635499 A | 8/2012 |
| CN | 102648345 A | 8/2012 |
| CN | 103133242 A | 6/2013 |
| CN | 103244354 A | 8/2013 |
| CN | 103835878 A | 6/2014 |
| EP | 1626175 A1 | 2/2006 |
| GB | 2487715 A | 8/2012 |
| KR | 20140119535 A | 10/2014 |

OTHER PUBLICATIONS

Germanischer Lloyd, Guideline for the Certification of Wind Turbines, Jul. 1, 2010, Hamburg, Germany.
Wind Turbines—Part 1: Design requirements, Jan. 1, 1997, Geneva, Switzerland.
The 1st Office Action along with the English Summary regarding Chinese Patent Application No. CN201510848517.0, dated Sep. 27, 2018.

* cited by examiner

CONTROL METHOD AND CONTROL APPARATUS OF WIND POWER GENERATOR SET

The present application is the national phase of International Application No. PCT/CN2016/074828, titled "CONTROL METHOD AND CONTROL APPARATUS OF WIND POWER GENERATOR SET" filed on Feb. 29, 2016, which claims the priority to Chinese Patent Application No. 201510848517.0, titled "CONTROL METHOD AND CONTROL APPARATUS OF WIND POWER GENERATOR SET" and filed with the State Intellectual Property Office of the People's Republic of China on Nov. 27, 2015, both of which are incorporated herein by reference their entireties.

FIELD OF THE INVENTION

The present disclosure relates to the technical field of wind power generator set control, and in particular to a control method and a control apparatus of a wind power generator set.

BACKGROUND OF THE INVENTION

Wind energy is a kind of clean and safe renewable resources. Wind power generation by means of a wind power generator set can guarantee energy security, adjust energy structure and alleviate environmental pollution, and thus is one of the most mature, the most widely used and the best prospective power generation methods, which has a great significance to achieve sustainable development.

A wind power generator set is usually designed by taking a level of wind resource characteristics specified in the IEC standards or GL specifications as an input standard. Turbulence in the wind resource characteristics has a direct impact on a fatigue load of the wind power generator set and is directly relevant to extreme gusts giving rise to an extreme load, thus having a great influence on lifespan of the wind power generator set. The turbulence is a natural uncontrollable factor, but turbulence intensity can be measured. To reduce influence of the turbulence on the wind power generator set, generally actual measured turbulence intensity is compared with the levels of turbulence intensity specified in the IEC standards or GL specifications. When the actual measured turbulence intensity is beyond a specified level, some corresponding measures are taken to guarantee the wind power generator set in stable and safe operation. In the prior art, the influence of the turbulence beyond the specified level on the wind power generator set is reduced by means of a shutdown when the actual measured turbulence intensity is beyond the specified level.

However, the shutdown manner in the prior art results in a serious loss of generated electric energy. The loss has little influence on a wind power plant with a flat terrain, an outstanding wind power characteristic, and with a small scale of wind power generator set not at a prevailing wind direction, while has great influence on a wind power plant with a complex terrain, a less obvious wind power characteristic, and with a large scale of wind power generator set or at a prevailing wind direction.

SUMMARY OF THE INVENTION

In view of the above, the present disclosure provides a control method and an apparatus of a wind power generator set, to not only reduce influence on a wind power generator set when turbulence intensity is beyond the specified level but also lower a loss of generated electric energy.

In order to attain the foregoing objective, the present disclosure provides the following technical solutions.

In an aspect, there is provided a control method of a wind power generator set in the present disclosure. The method includes:

acquiring a wind speed at a location of the wind power generator set, calculating turbulence intensity according to the wind speed, and determining a wind speed distribution range corresponding to the turbulence intensity;

determining a thrust variation amplitude of thrust in the wind speed distribution range based on a relationship among the thrust suffered by a wind wheel of the wind power generator set, a thrust coefficient and the wind speed; and adjusting a maximum rotating speed and a maximum torque of the wind wheel in the wind speed distribution range according to the thrust variation amplitude, where the maximum rotating speed and the maximum torque makes a fatigue load of the wind power generator set in the wind speed distribution range meet a preset standard.

Preferably, the above step of acquiring a wind speed at a location of the wind power generator set, calculating turbulence intensity according to the wind speed, and determining a wind speed distribution range corresponding to the turbulence intensity includes:

acquiring a wind speed at the location of the wind power generator set in a preset period, and calculating an average wind speed $\bar{v}$ in the preset period;

calculating the turbulence intensity $$I = \frac{\delta}{\bar{v}} = \frac{\sqrt{\frac{1}{N}\sum_{i=1}^{N}(v_i - \bar{v})^2}}{\bar{v}}$$

according to the average wind speed $\bar{v}$, and determining a Gaussian distribution $$f(v) = \frac{1}{\delta\sqrt{2\pi}} e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i - \bar{v})^2}}{\bar{v}};$$

and determining the wind speed distribution range ($\bar{v}-1.96\delta$, $\bar{v}+1.96\delta$) according to the theory of small probability event and the Gaussian distribution $$f(v) = \frac{1}{\delta\sqrt{2\pi}} e^{-\frac{(v-\bar{v})^2}{2\delta^2}},$$

where I denotes the turbulence intensity corresponding to the average wind speed $\bar{v}$, $v_i$ denotes an instantaneous wind speed of the i-th sampling point, and N denotes the number of sampling points in the preset period.

Preferably, the above step of determining a thrust variation amplitude of thrust in the wind speed distribution range based on a relationship among the thrust suffered by a wind wheel of the wind power generator set, a thrust coefficient and the wind speed includes:

determining a relation $$F = \frac{1}{2}\rho A v^2 C_t\left(\beta, \frac{\omega R}{v}\right)$$

among the thrust, a pitch angle $\beta$ of a blade of a wind wheel and a wind wheel rotating speed $\omega$ according to a relation $F = \frac{1}{2}\rho A v^2 C_t(\beta, \lambda)$ among the thrust suffered by the wind wheel of the wind power generator set, the thrust coefficient and the wind speed and according to a tip speed ratio $$\lambda = \frac{\omega R}{v}$$

of the wind wheel;

determining a minimum thrust $$F_{min-I} = \frac{1}{2}\rho A v_{min}^2 C_t\left(\beta_{opt}, \frac{\omega_{low}R}{v_{min}}\right)$$

corresponding to a minimum wind speed $v_{min} = \bar{v} - 1.96\delta$ in the wind speed distribution range and a maximum thrust $$F_{max-I} = \frac{1}{2}\rho A v_{max}^2 C_t\left(\beta_{opt}, \frac{\omega_{high}R}{v_{max}}\right)$$

corresponding to a maximum wind speed $v_{max} = \bar{v} + 1.96\delta$ in the wind speed distribution range according to the formula $$F = \frac{1}{2}\rho A v^2 C_t\left(\beta, \frac{\omega R}{v}\right);$$

and determining a thrust variation amplitude $$F_I = \frac{\sqrt{\frac{((F_{max-I} - F_{\bar{v}})^2 + (F_{min-I} - F_{\bar{v}})^2)}{2}}}{F_{\bar{v}}}$$

of the thrust in the wind speed distribution range according to the minimum thrust, the maximum thrust and a relation between the thrust and the wind speed $$F = \frac{\sqrt{\frac{1}{N}\sum_{i=1}^{N}(F_{v_i} - F_{\bar{v}})^2}}{F_{\bar{v}}},$$

where $\rho$ is an air density, A is a wind wheel swept area, v is a wind speed, $C_t(\beta, \lambda)$ is the thrust coefficient relevant to the pitch angle $\beta$ of the blade of the wind wheel and the tip speed ratio $\lambda$, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_I$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

Preferably, the above step of adjusting a maximum rotating speed and a maximum torque of the wind wheel in the wind speed distribution range according to the thrust variation amplitude includes:

adjusting the maximum rotating speed $\omega_{high}$ of the wind power generator set in the wind speed distribution range according to $$F_{I_2} = \frac{\sqrt{\frac{((F_{max-I_2} - F'_{\bar{v}})^2 + (F_{min-I_2} - F'_{\bar{v}})^2)}{2}}}{F'_{\bar{v}}} =$$

$$\frac{\sqrt{\frac{((F_{max-I_1} - F_{\bar{v}})^2 + (F_{min-I_2} - F_{\bar{v}})^2)}{2}}}{F_{\bar{v}}} = F_{I_1}$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed; and adjusting a maximum torque $T_{max-I_2} = T_{max-I_1} - T_{min-I_1} + T_{min-I_2}$ of the wind power generator set in the wind speed distribution range according to $T_{I_1} = T_{max-I_1} - T_{min-I_1} = T_{max-I_2} - T_{min-I_2} = T_{I_2}$ when the turbulence intensity increases from $I_1$ to $I_2$ and the torque variation amplitude of the wind power generator set changes from $(T_{min-I_1}, T_{max-I_1})$ to $(T_{min-I_2}, T_{max-I_2})$ due to variation of the wind speed, where $F'_{\bar{v}}$ is thrust corresponding to the maximum rotating speed.

Preferably, the method further includes:

restricting the maximum torque according to a power generation system characteristic curve of the wind power generator set.

In another aspect, there is provided a control apparatus of a wind power generator set in the present disclosure. The apparatus includes:

an acquisition module, configured to acquire a wind speed at a location of the wind power generator set, calculating turbulence intensity according to the wind speed, and determining a wind speed distribution range corresponding to the turbulence intensity;

a determining module, configured to determine a thrust variation amplitude of the thrust in the wind speed distribution range based on a relationship among the thrust suffered by a wind wheel of the wind power generator set, a thrust coefficient and the wind speed; and an adjusting module, configured to adjust a maximum rotating speed and a maximum torque of the wind wheel in the wind speed distribution range according to the thrust variation amplitude, and the maximum rotating speed and the maximum torque makes a fatigue load of the wind power generator set in the wind speed distribution range meet a preset standard.

Preferably, the acquisition module includes:

an acquisition module, configured to acquire a wind speed at the location of the wind power generator set in a preset period, and calculating an average wind speed $\bar{v}$ in the preset period;

a calculation unit, configured to calculate turbulence intensity $$I = \frac{\delta}{\bar{v}} = \frac{\sqrt{\frac{1}{N}\sum_{i=1}^{N}(v_i - \bar{v})^2}}{\bar{v}}$$

according to the average wind speed $\bar{v}$, and determining a Gaussian distribution $$f(v) = \frac{1}{\delta\sqrt{2\pi}} e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i - \bar{v})^2}}{\bar{v}};$$

and a first determining unit, configured to determine the wind speed distribution range $(\bar{v}-1.96\delta, \bar{v}+1.96\delta)$ according to the theory of small probability event and the Gaussian distribution $$f(v) = \frac{1}{\delta\sqrt{2\pi}} e^{-\frac{(v-\bar{v})^2}{2\delta^2}};$$

where I denotes the turbulence intensity corresponding to the average wind speed $\bar{v}$, $v_i$ denotes an instantaneous wind speed of the i-th sampling point, and N denotes the number of sampling points in the preset period.

Preferably, the determining module includes:

a second determining unit, configured to determine a relation $$F = \frac{1}{2}\rho A v^2 C_t\left(\beta, \frac{\omega R}{v}\right)$$

among the thrust, a pitch angle $\beta$ of a blade of a wind wheel and a wind wheel rotating speed $\omega$ according to a relation $F=\frac{1}{2}\rho A v^2 C_t(\beta, \lambda)$ among the thrust suffered by the wind wheel of the wind power generator set, a thrust coefficient and the wind speed and according to a tip speed ratio $$\lambda = \frac{\omega R}{v}$$

of the wind wheel;

a third determining unit, configured to determine a minimum thrust $$F_{min-1} = \frac{1}{2}\rho A v_{min}^2 C_t\left(\beta_{opt}, \frac{\omega_{low}R}{v_{min}}\right)$$

corresponding to a minimum wind speed $v_{min}=\bar{v}-1.96\delta$ in the wind speed distribution range and a maximum thrust $$F_{max-1} = \frac{1}{2}\rho A v_{max}^2 C_t\left(\beta_{opt}, \frac{\omega_{high}R}{v_{max}}\right)$$

corresponding to a maximum wind speed $v_{max}=\bar{v}+1.96\delta$ in the wind speed distribution range according to the formula $$F = \frac{1}{2}\rho A v^2 C_t\left(\beta, \frac{\omega R}{v}\right);$$

and a fourth determining unit, configured to determine a thrust variation amplitude $$F_I = \frac{\sqrt{\frac{((F_{max-1} - F_{\bar{v}})^2 + (F_{min-1} - F_{\bar{v}})^2)}{2}}}{F_{\bar{v}}}$$

of the thrust in the wind speed distribution range according to the minimum thrust, the maximum thrust and a relation between the thrust and the wind speed $$F = \frac{\sqrt{\frac{1}{N}\sum_{i=1}^{N}(F_{v_i} - F_{\bar{v}})^2}}{F_{\bar{v}}};$$

where $\rho$ is an air density, A is a wind wheel swept area, v is a wind speed, $C_t(\beta, \lambda)$ is the thrust coefficient relevant to the pitch angle $\beta$ of the blade of the wind wheel and the tip speed ratio $\lambda$, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_I$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

Preferably, the adjusting module includes:

a rotating speed adjusting unit, configured to adjust a maximum rotating speed $\omega_{high}$ of the wind power generator set in the wind speed distribution range according to $$F_{I_2} = \frac{\sqrt{\frac{((F_{max-I_2} - F'_{\bar{v}})^2 + (F_{min-I_2} - F'_{\bar{v}})^2)}{2}}}{F'_{\bar{v}}} =$$

$$\frac{\sqrt{\frac{((F_{max-I_1} - F_{\bar{v}})^2 + (F_{min-I_1} - F_{\bar{v}})^2)}{2}}}{F_{\bar{v}}} = F_{I_1}$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed; and a torque adjusting unit, configured to adjust a maximum torque $T_{max-I_2} = T_{max-I_1} - T_{min-I_1} + T_{min-I_2}$ of the wind power generator set in the wind speed distribution range according to $T_{I_1} = T_{max-I_1} - T_{min-I_1} = T_{max-I_2} - T_{min-I_2} = T_{I_2}$ when the turbulence intensity increases from $I_1$ to $I_2$ to $I_2$ and the torque variation amplitude of the wind power generator set changes from $(T_{min-I_1}, T_{max-I_1})$ to $(T_{min-I_2}, T_{max-I_2})$ due to variation of the wind speed;

where $F'_{\bar{v}}$ is thrust corresponding to the maximum rotating speed.

Preferably, the apparatus further includes:

a restricting module, configured to restrict the maximum torque according to a power generation system characteristic curve of the wind power generator set.

It is apparent from the above technical solutions that, with the control method and a control apparatus of a wind power generator set provided in the present disclosure, a wind speed at a location of the wind power generator set is acquired, turbulence intensity is calculated according to the wind speed, and a wind speed distribution range corresponding to the turbulence intensity is determined; a thrust variation amplitude of the thrust in the wind speed distribution range is determined based on a relationship among the thrust suffered by a wind wheel of the wind power generator set, a thrust coefficient and the wind speed; and a maximum rotating speed and a maximum torque of the wind wheel in the wind speed distribution range are adjusted according to the thrust variation amplitude, where the maximum rotating speed and the maximum torque makes a fatigue load of the wind power generator set in the wind speed distribution range meet a preset standard. With the technical solutions provided in the present disclosure, a wind speed distribution range is determined according to actual measured turbulence intensity, and then a maximum rotating speed and a maximum torque are adjusted according to the wind speed distribution range. When the turbulence intensity is beyond a specified level, a fatigue load of a wind power generator set in the wind speed distribution range is made to meet a preset standard by adjusting the maximum rotating speed and the maximum torque, instead of shutting down the wind power generator set. Thereby influence on the wind power generator set is reduced when the turbulence intensity is beyond the specified level and a loss of generated electric energy is lowered.

BRIEF DESCRIPTION OF THE DRAWINGS

The accompany drawings used in the description of the embodiments will be described briefly as follows, so that the technical solutions according to the embodiments of the present disclosure will become more apparent. It is clear that the accompany drawings in the following description are only some embodiments of the present disclosure. For those skilled in the art, other accompany drawings may be obtained according to these accompany drawings without any creative work.

DETAILED DESCRIPTION OF THE EMBODIMENTS

The technical solutions according to the embodiments of the present disclosure will be described clearly and completely as follows in conjunction with the accompany drawings in the embodiments of the present disclosure. It is clear that the described embodiments are only a part of the embodiments according to the present disclosure. All the other embodiments obtained by those skilled in the art based on the embodiments in the present disclosure without any creative work falls within the scope of the present disclosure.

Figure 6:
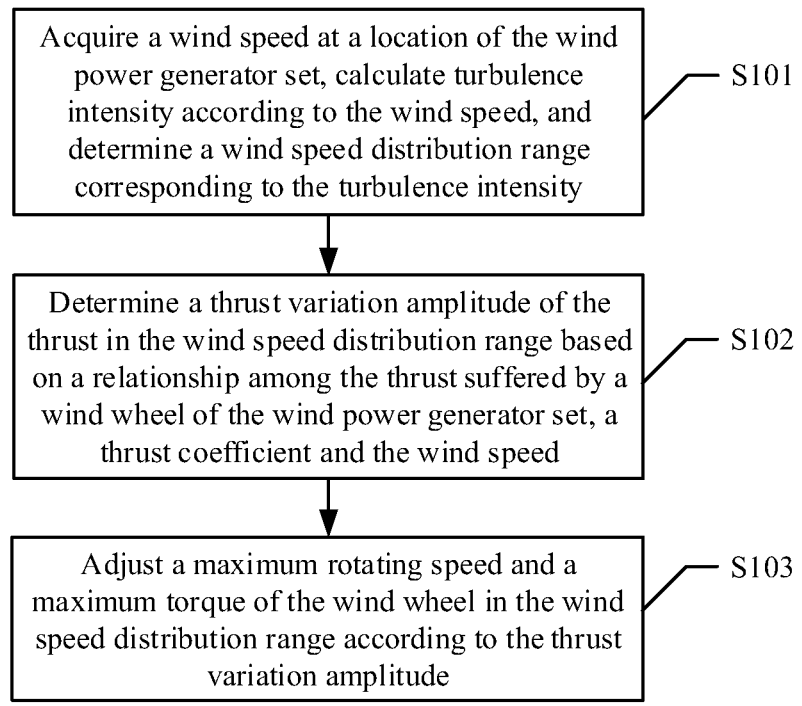
FIG. 6 is a flowchart of a control method of a wind power generator set provided in the present disclosure.

FIG. 6 is a flowchart of a control method of a wind power generator set provided in the present disclosure.

As shown in FIG. 6, a control method of a wind power generator set provided according to an embodiment of the present disclosure includes steps S101 to S103.

In step S101, a wind speed at a location of the wind power generator set is acquired, turbulence intensity is calculated according to the wind speed, and a wind speed distribution range corresponding to the turbulence intensity is determined.

The turbulence intensity (TI) refers to random variation amplitude of a wind speed in ten minutes, which is defined as a ratio of an average wind speed standard deviation in ten minutes to the average wind speed during the period. The turbulence intensity is a dominating factor of a normal fatigue load sustained by a wind power generator set during operation, and is also one of the most important parameters of safety level classification for a wind power generator set in IEC61400-1.

The relation between turbulence intensity and wind speed is expressed as formula (1):

$$I = \frac{\delta}{\bar{v}} = \frac{\sqrt{\frac{1}{N}\sum_{i=1}^{N}(v_i - \bar{v})^2}}{\bar{v}} \quad (1)$$

where $\bar{v}$ denotes an average wind speed in ten minutes, I denotes the turbulence intensity corresponding to the average wind speed $\bar{v}$, $\delta$ denotes standard deviation, $v_i$ denotes an instantaneous wind speed at the i-th sampling point, and N denotes a sampling number in ten minutes.

According to the definition of turbulence intensity, a wind speed distribution corresponding to the turbulence intensity can be understood as a Gaussian distribution of the wind speed, with a center of $\bar{v}$ and a standard deviation of $$\delta = \sqrt{\frac{1}{N}\sum_{i=1}^{N}(v_1 - \bar{v})^2}.$$

The wind speed distribution is formulated as formula (2):

$$f(v) = \frac{1}{\delta\sqrt{2\pi}}e^{-\frac{(v-\bar{v})^2}{2\delta^2}} \qquad (2)$$

Figure 1:
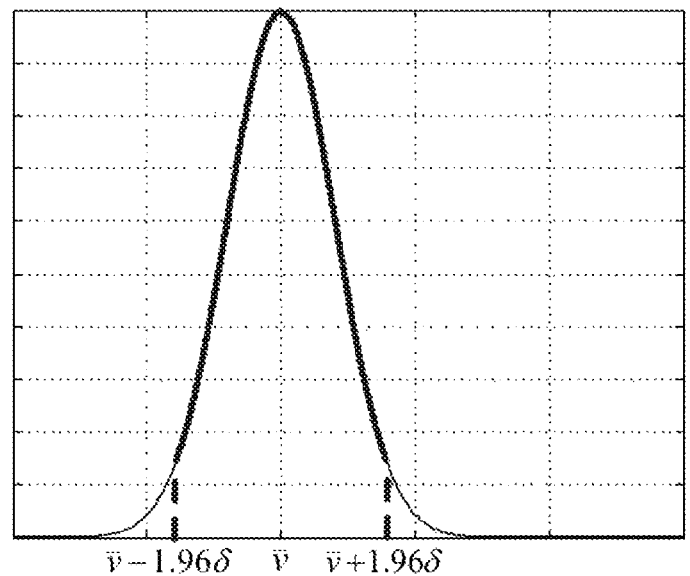
FIG. 1 is a schematic diagram illustrating a wind speed distribution range corresponding to turbulence intensity.

As shown in FIG. 1, a schematic diagram of wind speed distribution corresponding to any known average wind speed and standard deviation can be drawn according to formula (2). Combining with the theory of small probability events (probability of occurrence is small than 5%) in the probability theory and an important area proportional relation in a Gaussian distribution, i.e., the area within the horizontal axis range ($\bar{v}$−1.96$\delta$, $\bar{v}$+1.96$\delta$) is 95.4% of the total area, it can be considered that the wind speed is mainly distributed in the range of ($\bar{v}$−1.96$\delta$, $\bar{v}$+1.96$\delta$) due to the influence of turbulence intensity, which is illustrated with a thick line in FIG. 1.

Figure 2:
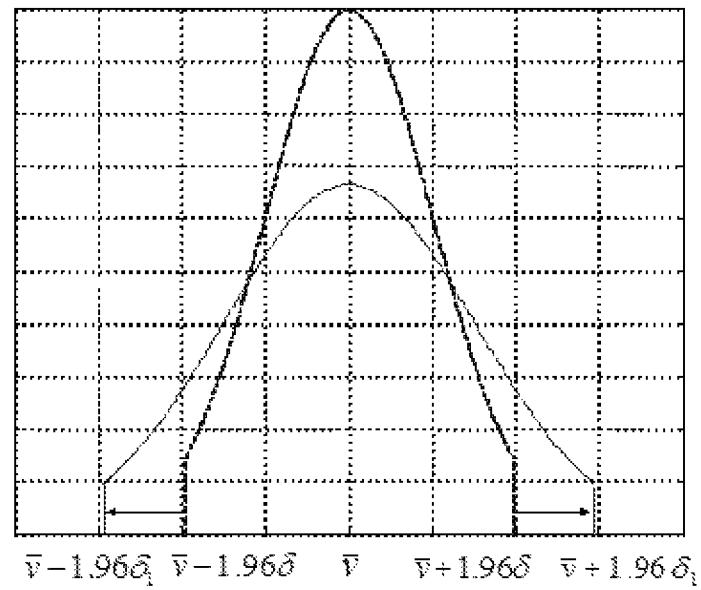
FIG. 2 is a schematic diagram illustrating a wind speed distribution range variation corresponding to turbulence intensity variation.

When turbulence intensity corresponding to the same average wind speed increases, the corresponding wind speed distribution range will be enlarged. As shown in FIG. 2, as the increase of turbulence intensity, the main wind speed distribution range extends from ($\bar{v}$−1.96$\delta$, $\bar{v}$+1.96$\delta$) to ($\bar{v}$−1.96$\delta_1$, $\bar{v}$+1.96$\delta_1$), that is, the maximum wind speed $v_{max}$ in the wind speed distribution is increased from $\bar{v}$−1.96$\delta$, $\bar{v}$+1.96$\delta$ to $\bar{v}$−1.96$\delta$, $\bar{v}$+1.96$\delta_1$.

From the foregoing, in embodiments of the present disclosure, the step of acquiring a wind speed at a location of the wind power generator set, calculating turbulence intensity according to the wind speed, and determining a wind speed distribution range corresponding to the turbulence intensity includes:

acquiring a wind speed at the location of the wind power generator set in a preset period like ten minutes, and calculating an average wind speed $\bar{v}$ in the preset period;

calculating turbulence intensity $$I = \frac{\delta}{\bar{v}} = \frac{\sqrt{\frac{1}{N}\sum_{i=1}^{N}(v_1-\bar{v})^2}}{\bar{v}}$$

according to the average wind speed $\bar{v}$, and determining a Gaussian distribution $$f(v) = \frac{1}{\delta\sqrt{2\pi}}e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i-\bar{v})^2}}{\bar{v}}; \text{ and}$$

determining the wind speed distribution range ($\bar{v}$−1.96$\delta$, $\bar{v}$+1.96$\delta$) according to the theory of small probability event and the Gaussian distribution $$f(v) = \frac{1}{\delta\sqrt{2\pi}}e^{-\frac{(v-\bar{v})^2}{2\delta^2}},$$

where I denotes the turbulence intensity corresponding to the average wind speed $\bar{v}$, $v_i$ denotes an instantaneous wind speed of the i-th sampling point, and N denotes the number of sampling points in the preset period.

In step S102, a thrust variation amplitude of the thrust in the wind speed distribution range is determined based on a relationship among the thrust suffered by a wind wheel of the wind power generator set, a thrust coefficient and the wind speed.

In combination with a dominant load distribution of the wind power generator set, it is known that the turbulence near a rated wind speed plays a dominant role on a fatigue load of most key or important components of the wind power generator set. For any wind speed in a full wind speed distribution range of a specific wind power generator set, the turbulence intensity beyond the specified level should be converted into a theoretical rated wind speed by a calculation method according to standard turbulence intensity definition, and a control is performed to decrease the fatigue load generated by a over-standard turbulence intensity corresponding to the rated wind speed.

According to the following relation (3) among thrust, a wind speed and a thrust coefficient, the thrust suffered by a wind wheel is in direct proportion to square of the wind speed and the thrust coefficient. Therefore, the thrust coefficient needs to be decreased to reduce the thrust when the wind speed increases.

$$F = \frac{1}{2}\rho A v^2 C_t(\beta, \lambda) \qquad (3)$$

where $\rho$ is an air density, A is a wind wheel swept area, v is a wind speed, and $C_t(\beta, \lambda)$ is the thrust coefficient relevant to a pitch angle $\beta$ of a blade and a tip speed ratio. The tip speed ratio $\lambda$, is expressed as:

$$\lambda = \frac{\omega R}{v} \qquad (4)$$

where $\omega$ is a wind wheel rotating speed, R is a wind wheel radius, and v is the wind speed.

Figure 3:
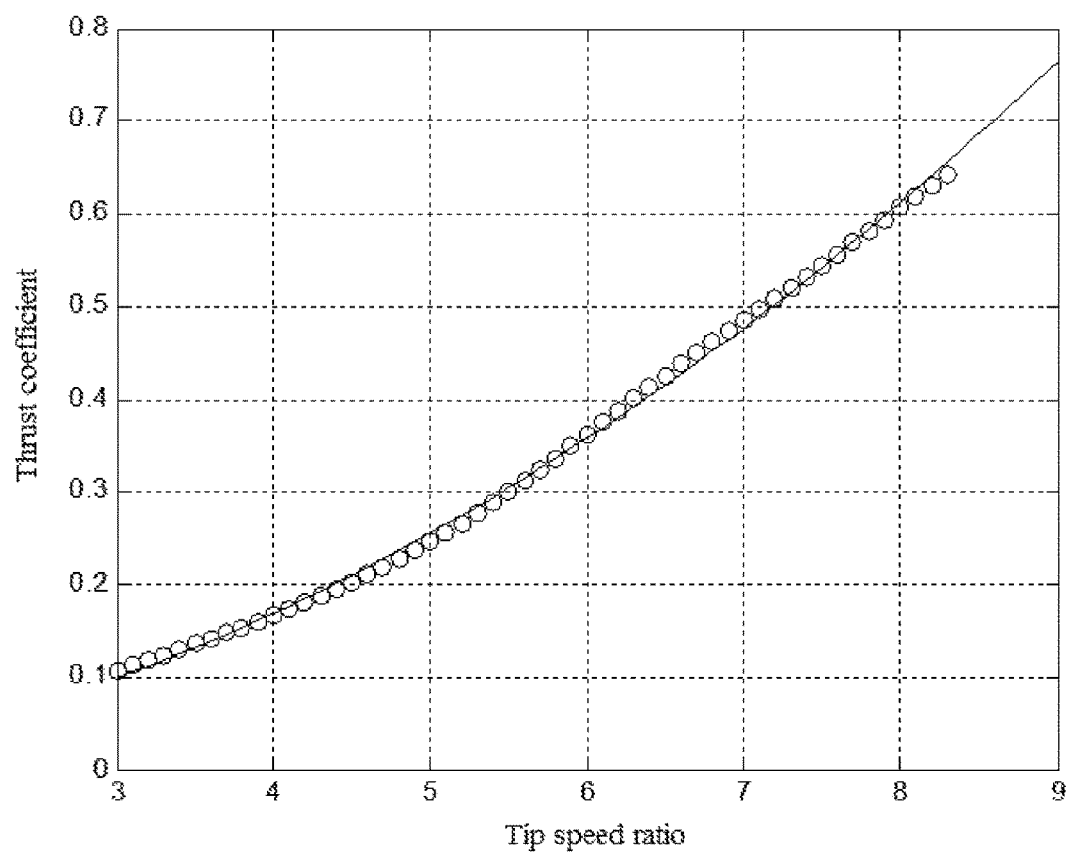
FIG. 3 is a schematic diagram illustrating a relationship between a tip speed ratio and a thrust coefficient provided in the present disclosure.

There is no direct transformational relation between the thrust coefficient $C_t$ and the pitch angle $\beta$. Moreover, it is complicated to build a relation between them due to the impact of a non-linear aerodynamic characteristic of the blade. Furthermore, if a minimum pitch angle is configured according to turbulence intensity, the ability of absorbing wind energy at a low wind speed may be decreased, resulting in an overmuch loss of the wind energy. However, since the thrust coefficient is directly related to the tip speed ratio, and the tip speed ratio is directly related to the rotating speed, a direct relation $C_t=f(\omega)$ between the thrust coefficient and the rotating speed in the condition of a specific pitch angle $\beta$ is built. As shown in FIG. 3, "o" represents a corresponding relation between a tip speed ratio of a blade and a thrust coefficient, and the solid line is a fitting relation curve by the following second-order formula (5).

$$C_t = a*\left(\frac{\omega R}{v}\right)^2 + b*\left(\frac{\omega R}{v}\right) + c \tag{5}$$

By further combining with the tip speed ratio formula (4), it is known that the thrust coefficient is relevant to pitch angle of a blade and wind speed of a wind wheel. Therefore, by adjusting the pitch angle of a blade or the wind speed of a wind wheel, the purpose of decreasing the thrust coefficient may be realized.

A relation among the thrust, the pitch angle and the rotating speed of a wind wheel is derived in follows according to formulas (3)-(4):

$$F = \frac{1}{2}\rho A v^2 C_t\left(\beta, \frac{\omega R}{v}\right) \tag{6}$$

Figure 4:
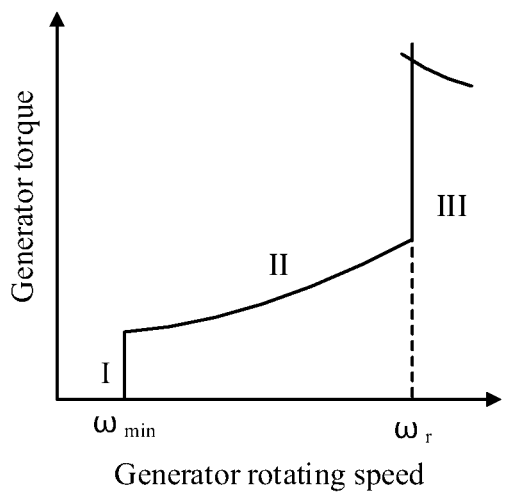
FIG. 4 is a schematic diagram illustrating control of a rotating speed and a torque of a wind power generator set provided in the present disclosure.

Considering an extreme condition in combination with the influence of turbulence intensity on the main wind speed distribution, it is known from FIG. 4 that the wind wheel maintains at a rated rotating speed, i.e., $\omega_{high}=\omega_r$, and maintains at an optimum pitch angle, i.e., $\beta=\beta_{opt}$, when the wind speed generated by the turbulence increases from $\bar{v}$ to a maximum wind speed $v_{max}=\bar{v}+1.96\delta$, for a reason of hysteresis of change of wind wheel rotating and pitch action. A maximum thrust produced for an increase of the wind speed is obtained in formula (7) by combining with formula (6).

$$F_{max-1} = \frac{1}{2}\rho A v_{max}^2 C_t\left(\beta_{opt}, \frac{\omega_{high}R}{v_{max}}\right) \tag{7}$$

When the wind speed generated by the turbulence decreases from $\bar{v}$ to a minimum wind speed $v_{min}=1.96\delta$, it is known according to FIG. 4, the wind wheel rotating speed may fall in region II or region I for influence of wind speed range. When the rotating speed is in region I, the rotating speed is $\omega_{low}=\omega_{min}$, where $\omega_{min}$ is a minimum rotating speed of a wind power generator set in grid connection. When the rotating speed is in region II, the wind power generator set is running in a state with an optimum tip speed ratio, and the corresponding rotating speed may be calculated by the following formula:

$$\omega_{low} = \frac{\lambda_{opt} v}{R} \tag{8}$$

where $\lambda_{opt}$ is an optimum tip speed ratio.

The minimum thrust is obtained in the following formula (9) by combining with formula (6).

$$F_{min-1} = \frac{1}{2}\rho A v_{min}^2 C_t\left(\beta_{opt}, \frac{\omega_{low}R}{v_{min}}\right) \tag{9}$$

Combining with the definition of turbulence intensity, force variation intensity of a wind power generator set in a direction perpendicular to the wind wheel plane is defined as formula (10), representing variation amplitude of the thrust suffered by the wind power generator set produced by random wind speed variation, as the principle of the turbulence intensity definition.

$$F = \frac{\sqrt{\frac{1}{N}\sum_{i=1}^{N}(F_{v_i} - F_{\bar{v}})^2}}{F_{\bar{v}}} \tag{10}$$

$$F_{\bar{v}} = \frac{1}{2}\rho A \bar{v}^2 C_t\left(\beta_{opt}, \frac{\omega_r R}{\bar{v}}\right) \tag{11}$$

where $F_{\bar{v}}$ is thrust suffered at the average wind speed $\bar{v}$, $F_I$ is a thrust variation amplitude during the preset time at the average wind speed $\bar{v}$ and at the turbulence intensity I, $F_{v_i}$ is thrust suffered by the wind wheel at the i-th sampling point with an instantaneous wind speed of $v_i$ and N is the number of sampling points.

Considering an extreme condition and engineering simplification, $F_I$ in different turbulence intensity is calculated by formula (12) according to formula (10).

$$F_I = \frac{\sqrt{((F_{max-1} - F_{\bar{v}})^2 + (F_{min-1} - F_{\bar{v}})^2)}}{\frac{2}{F_{\bar{v}}}} \tag{12}$$

From the foregoing, in embodiments of the present disclosure, the step of determining a thrust variation amplitude of the thrust in the wind speed distribution range based on a relationship among the thrust suffered by a wind wheel of the wind power generator set, a thrust coefficient and the wind speed includes:

determining a relation $$F = \frac{1}{2}\rho A v^2 C_t\left(\beta, \frac{\omega R}{v}\right)$$

among the thrust, a pitch angle $\beta$ of a blade of a wind wheel and a wind wheel rotating speed $\omega$ according to a relation $F=\frac{1}{2}\rho A v^2 C_t(\beta, \lambda)$ among the thrust suffered by the wind wheel of the wind power generator set, a thrust coefficient and the wind speed, and according to a tip speed ratio $$\lambda = \frac{\omega R}{v}$$

of the wind wheel;

determining a minimum thrust $$F_{min-1} = \frac{1}{2}\rho A v_{min}^2 C_t\left(\beta_{opt}, \frac{\omega_{low}R}{v_{min}}\right)$$

corresponding to a minimum wind speed $v_{min} = \bar{v}1.96\delta$ in the wind speed distribution range and a maximum thrust $$F_{max-1} = \frac{1}{2}\rho A v_{max}^2 C_t\left(\beta_{opt}, \frac{\omega_{high}R}{v_{max}}\right)$$

corresponding to a maximum wind speed $v_{max} = \bar{v}+1.96\delta$ in the wind speed distribution range according to the formula $$F = \frac{1}{2}\rho A v^2 C_t\left(\beta, \frac{\omega R}{v}\right);$$

and determining a thrust variation amplitude $$F_I = \frac{\sqrt{\frac{((F_{max-1} - F_{\bar{v}})^2 + (F_{min-1} - F_{\bar{v}})^2)}{2}}}{F_{\bar{v}}}$$

of the thrust in the wind speed distribution range according to the minimum thrust, the maximum thrust and the relation between the thrust and the wind speed $$F = \frac{\sqrt{\frac{1}{N}\sum_{i=1}^{N}(F_{v_i} - F_{\bar{v}})^2}}{F_{\bar{v}}}.$$

In the above, ρ is an air density, A is a wind wheel swept area, v is a wind speed, $C_t(\beta, \lambda)$ is the thrust coefficient relevant to the pitch angle β of the blade of the wind wheel and the tip speed ratio λ, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_I$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

In step S103, a maximum rotating speed and a maximum torque of the wind wheel in the wind speed distribution range are adjusted according to the thrust variation amplitude. The maximum rotating speed and the maximum torque makes a fatigue load of the wind power generator set in the wind speed distribution range meet a preset standard.

According to the theory of rain flow counting and equivalent load calculation of a fatigue load, $F_I$ needs to remain unchanged if the fatigue load of a wind power generator set keeps unchanged under different turbulence intensity conditions. That is, when the turbulence intensity increases from $I_1$ to $I_2$, it is necessary to keep $F_{I_2} = F_{I_1}$. According to formula (6), when pitch angle remains unchanged, the force F can be changed only by adjusting the rotating speed ω. According to formula (8), a minimum rotating speed is difficult to adjust due to the influence of an optimum tip speed ratio and the wind speed, while the rotating speed $\omega_{high}$ is not influenced and thus can be adjusted freely. So $F_I$ is controlled by adjusting rated rotating speed $\omega_r$, and the corresponding $F_{\bar{v}}$ will be changed when adjusting the $\omega_r$. Based on the above, $\omega_r'$ satisfying the equation (13) is calculated in combination with formulas (5)-(12).

$$F_{I_2} = \frac{\sqrt{\frac{((F_{max-I_2} - F_{\bar{v}}')^2 + (F_{min-I_2} - F_{\bar{v}}')^2)}{2}}}{F_{\bar{v}}'} = \frac{\sqrt{\frac{((F_{max-I_1} - F_{\bar{v}})^2 + (F_{min-I_1} - F_{\bar{v}})^2)}{2}}}{F_{\bar{v}}} = F_{I_1} \quad (13)$$

On the basis of the above condition of not changing the fatigue load in the thrust direction, the influence of wind wheel rotating direction on a drive chain torsional fatigue load also needs to be considered. According to influence rule of the drive chain torsional fatigue, the statistic which has a great influence on the drive chain torsional fatigue is the mean value of load amplitude. That is, the influence of turbulence variation on a torsional fatigue load may be controlled by means of keeping the mean value of the drive chain torque amplitude about the same.

When the turbulence increases from $I_1$ to $I_2$, the corresponding drive chain torque variation amplitude changes from $(T_{min-I_1}, T_{max-I_1})$ to $(T_{min-I_2}, T_{max-I_2})$ due to impact of wind speed distribution variation. The following equation (14) needs to be satisfied to keep the torsional fatigue about the same.

$$T_{I_1} = T_{max-I_1} - T_{min-I_1} = T_{max-I_2} - T_{min-I_2} = T_{I_2} \quad (14)$$

According to an original design, the maximum torque is $T_{max-I_1} = T_r$, where $T_r$ is rated torque. Similar to the foregoing analysis on thrust, the wind wheel rotating speed may fall into region II or region I in FIG. 4 due to impact of wind speed range. When the wind wheel rotating speed is in region I, the rotating speed is $\omega_{low} = \omega_{min}$. When the rotating speed is in region II, the wind power generator set is running in a state with optimum tip speed ratio, and the rotating speed is calculated according to formula (8). The torque T is calculated according to formula (15), where $C_p$ is wind energy utilization factor.

$$T = \frac{\pi \rho R^5 C_p \omega^2}{2\lambda^3 G^3} \quad (15)$$

The maximum torque permitted when the turbulence intensity increases to $I_2$ is calculated according to formulas (14) and (16).

$$T_{max-I_2} = T_{max-I_1} - T_{min-I_1} + T_{min-I_2} \quad (16)$$

From the above, in embodiments of the present disclosure, the step of adjusting a maximum rotating speed and a maximum torque of the wind wheel in the wind speed distribution range according to the thrust variation amplitude includes:

adjusting a maximum rotating speed $\omega_{high}$ of the wind power generator set in the wind speed distribution range according to $$F_{I_2} = \frac{\sqrt{\frac{((F_{max-I_2} - F'_{\bar{v}})^2 + (F_{min-I_2} - F'_{\bar{v}})^2)}{2}}}{F'_{\bar{v}}} = \frac{\sqrt{\frac{((F_{max-I_1} - F_{\bar{v}})^2 + (F_{min-I_1} - F_{\bar{v}})^2)}{2}}}{F_{\bar{v}}} = F_{I_1} \quad (13)$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed; and adjusting a maximum torque $T_{max-I_2} = T_{max-I_1} - T_{min-I_1} + T_{min-I_2}$ of the wind power generator set in the wind speed distribution range according to $T_{I_1} = T_{max-I_1} - T_{min-I_1} = T_{max-I_2} - T_{min-I_2} = T_{I_2}$ when the turbulence intensity increases from $I_1$ to $I_2$ and the torque variation amplitude of the wind power generator set changes from $(T_{min-I_1}, T_{max-I_1})$ to $(T_{min-I_2}, T_{max-I_2})$ due to variation of the wind speed, where $F'_{\bar{v}}$ is thrust corresponding to the maximum rotating speed.

Figure 5:
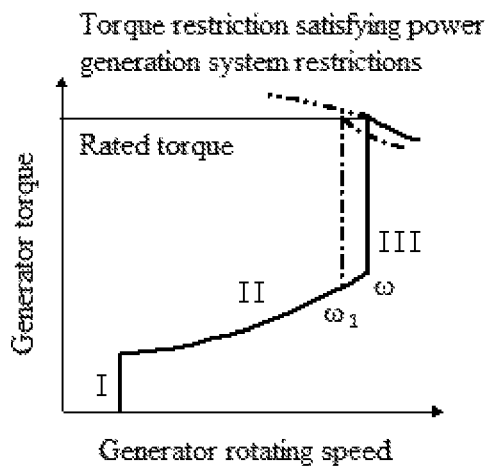
FIG. 5 is a schematic diagram illustrating an operation curve of a rotating speed and a torque of a wind power generator set provided in the present disclosure.

It is important to note that, in embodiments of the present disclosure, when the rotating speed and torque are adjusted according to the method above, restrictions on matching the rotating speed with the torque of a power generation system also need to be considered. The output maximum torque is restricted according to temperature rise relationship of the power generation system, and the limit value is relevant to characteristics of the power generation system. As shown in FIG. 5, the maximum torque is restricted according to a power generation system characteristic curve of the wind power generator set.

In the technical solutions in embodiments of the present disclosure, the turbulent wind speed distribution range is determined based on influence of turbulence intensity on wind speed distribution and by means of a statistic method of great possibility events in the probability theory, then the force variation intensity of a wind power generator set in a direction perpendicular to wind wheel plane is defined in combination with definition of the turbulence intensity, and finally a solution to control the rotating speed and torque to satisfy a standard fatigue load is obtained according to a calculation principle of the fatigue load. With the above technical solutions, influence of over-standard turbulence intensity on a fatigue load of a wind power generator set may be eliminated, and a loss of electric energy production brought by a fatigue load caused by decreasing the over-standard turbulence may be reduced.

Figure 7:
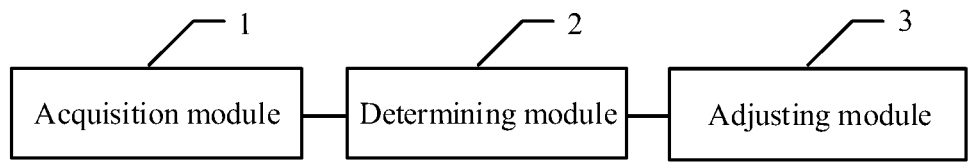
FIG. 7 is a structural schematic diagram illustrating a control apparatus of a wind power generator set provided in the present disclosure.

FIG. 7 is a structure schematic diagram illustrating a control apparatus of a wind power generator set provided in the present disclosure.

Referring to FIG. 7, the control apparatus of a wind power generator set includes an acquisition module 1, a determining module 2, and an adjusting module 3.

The acquisition module 1 is configured to acquire a wind speed at a location of the wind power generator set, calculate turbulence intensity according to the wind speed, and determine a wind speed distribution range corresponding to the turbulence intensity.

The determining module 2 is configured to determine a thrust variation amplitude of the thrust in the wind speed distribution range based on a relationship among the thrust suffered by a wind wheel of the wind power generator set, a thrust coefficient and the wind speed.

The adjusting module 3 is configured to adjust a maximum rotating speed and a maximum torque of the wind wheel in the wind speed distribution range according to the thrust variation amplitude. The maximum rotating speed and the maximum torque makes a fatigue load of the wind power generator set in the wind speed distribution range meet a preset standard.

Preferably, the acquisition module 1 includes an acquisition module, a calculation unit, and a first determining unit.

The acquisition module is configured to acquire a wind speed at the location of the wind power generator set in a preset period, and calculate an average wind speed $\bar{v}$ in the preset period.

The calculation unit is configured to calculate turbulence intensity $$I = \frac{\delta}{\bar{v}} = \frac{\sqrt{\frac{1}{N}\sum_{i=1}^{N}(v_i - \bar{v})^2}}{\bar{v}}$$

according to the average wind speed $\bar{v}$, and determine a Gaussian distribution $$f(v) = \frac{1}{\delta\sqrt{2\pi}} e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i - \bar{v})^2}}{\bar{v}}.$$

The first determining unit is configured to determine the wind speed distribution range $(\bar{v}-1.96\delta, \bar{v}+1.96\delta)$ according to the theory of small probability event and the Gaussian distribution $$f(v) = \frac{1}{\delta\sqrt{2\pi}} e^{-\frac{(v-\bar{v})^2}{2\delta^2}}.$$

In the above, I denotes the turbulence intensity corresponding to the average wind speed $\bar{v}$, $v_i$ denotes an instantaneous wind speed of the i-th sampling point, and N denotes the number of sampling points in the preset period.

Preferably, the determining module 2 includes a second determining unit, a third determining unit, and a fourth determining unit.

The second determining unit is configured to determine a relation $$F = \frac{1}{2}\rho A v^2 C_t\left(\beta, \frac{\omega R}{v}\right)$$

among the thrust, a pitch angle β of a blade of a wind wheel and a wind wheel rotating speed ω according to a relation $F=1/2\rho A v^2 C_t(\beta, \lambda)$ among the thrust suffered by the wind wheel of the wind power generator set, the thrust coefficient and the wind speed and according to a tip speed ratio $$\lambda = \frac{\omega R}{v}$$

of the wind wheel.

The third determining unit is configured to determine a minimum thrust $$F_{min-1} = \frac{1}{2}\rho A v_{min}^2 C_t\left(\beta_{opt}, \frac{\omega_{low}R}{v_{min}}\right)$$

corresponding to a minimum wind speed $v_{min}=\bar{v}-1.96\delta$ in the wind speed distribution range and a maximum thrust $$F_{max-1} = \frac{1}{2}\rho A v_{max}^2 C_t\left(\beta_{opt}, \frac{\omega_{high}R}{v_{max}}\right)$$

corresponding to a maximum wind speed $v_{max}=\bar{v}-1.96\delta$ in the wind speed distribution range according to the formula $$F = \frac{1}{2}\rho A v^2 C_t\left(\beta, \frac{\omega R}{v}\right).$$

The fourth determining unit is configured to determine a thrust variation amplitude $$F_I = \frac{\sqrt{\frac{((F_{max-I} - F_{\bar{v}})^2 + (F_{min-I} - F_{\bar{v}})^2)}{2}}}{F_{\bar{v}}}$$

of the thrust in the wind speed distribution range according to the minimum thrust, the maximum thrust and a relation between the thrust and the wind speed $$F = \frac{\sqrt{\frac{1}{N}\sum_{i=1}^{N}(F_{v_i} - F_{\bar{v}})^2}}{F_{\bar{v}}}.$$

In the above, ρ is an air density, A is a wind wheel swept area, v is a wind speed, $C_t(\beta, \lambda)$ is the thrust coefficient relevant to the pitch angle β of the blade of the wind wheel and the tip speed ratio λ, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_I$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

Preferably, the adjusting module 3 includes a rotating speed adjusting unit and a torque adjusting unit.

The rotating speed adjusting unit is configured to adjust a maximum rotating speed $\omega_{high}$ of the wind power generator set in the wind speed distribution range according to $$F_{I_2} = \frac{\sqrt{\frac{((F_{max-I_2} - F'_{\bar{v}})^2 + (F_{min-I_2} - F'_{\bar{v}})^2)}{2}}}{F'_{\bar{v}}} =$$

$$\frac{\sqrt{\frac{((F_{max-I_1} - F_{\bar{v}})^2 + (F_{min-I_1} - F_{\bar{v}})^2)}{2}}}{F_{\bar{v}}} = F_{I_1}$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed.

The torque adjusting unit is configured to adjust a maximum torque $T_{max-I_2}=T_{max-I_1}-T_{min-I_1}+T_{min-I_2}$ of the wind power generator set in the wind speed distribution range according to $T_{I_1}=T_{max-I_1}-T_{min-I_1}=T_{max-I_2}-T_{min-I_2}=T_{I_2}$ when the turbulence intensity increases from $I_1$ to $I_2$ and the torque variation amplitude of the wind power generator set changes from $(T_{min-I_1}, T_{max-I_1})$ to $(T_{min-I_2}, T_{max-I_2})$ due to variation of the wind speed.

In the above, $F'_{\bar{v}}$ is thrust corresponding to the maximum rotating speed.

Preferably, the control apparatus provided in embodiments of the present disclosure further includes a restricting module.

The restricting module is configured to restrict the maximum torque according to a power generation system characteristic curve of the wind power generator set.

It is important to note that, the control apparatus of a wind power generator set provided in the embodiments can adopt the control method of a wind power generator set in the foregoing method embodiments to realize all technical solutions in the above method embodiments. Functions of each module may be achieved specifically according to methods in the foregoing method embodiments. For the details of processes, reference may be made to relevant descriptions in the above embodiments, which will not be repeated herein.

It is apparent from the above technical solutions that, with the control method and the control apparatus of a wind power generator set provided in the present disclosure, a wind speed at a location of the wind power generator set is acquired, turbulence intensity is calculated according to the wind speed, and a wind speed distribution range corresponding to the turbulence intensity is determined; a thrust variation amplitude of the thrust in the wind speed distribution range is determined based on a relationship among the thrust suffered by a wind wheel of the wind power generator set, a thrust coefficient and the wind speed; and a maximum rotating speed and a maximum torque of the wind wheel in the wind speed distribution range are adjusted according to the thrust variation amplitude, where the maximum rotating speed and the maximum torque makes a fatigue load of the wind power generator set in the wind speed distribution range meet a preset standard. With the technical solutions provided in the present disclosure, a wind speed distribution range is determined according to actual measured turbulence intensity, and then a maximum rotating speed and a maximum torque are adjusted according to the wind speed distribution range. When the turbulence intensity is beyond a specified level, a fatigue load of a wind power generator set in the wind speed distribution range is made to meet a preset standard by adjusting the maximum rotating speed and the maximum torque, instead of shutting down the wind power generator set. Thereby influence on the wind power generator set is reduced when the turbulence intensity is beyond the specified level and a loss of generated electric energy is lowered.

For illustrating the technical solutions provided in the present disclosure being applied to a wind power generator set, taking a 2 MW wind power generator set as an example, fatigue loads, which are adjusted and controlled by means of the above methods, are calculated respectively under conditions of exceeding 20%, 40%, and 60% of A-class turbulence according to the standard A-class turbulence intensity in the GL specifications.

The following tables illustrate a ratio of a fatigue load at a key coordinate point of a wind power generator set to a standard A-class turbulence design value, in the condition of a ratio of adjusted rotating speed to rated rotating speed $\omega_r$ and a ratio of adjusted torque to rated torque $T_r$ calculated by means of the foregoing methods for different over-standard turbulence intensity. As shown in Table 1-11, by applying the methods to adjust a controlling state synthetically according to turbulence intensity variation, a fatigue load at a key coordinate point of a wind power generator set is at most 3% over a standard design value, which hardly affects security and service life of the wind power generator set.

TABLE 1

Blade Root Mx Fatigue Load Comparison

| Blade root 1 Mx [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.972 | 0.983 | 0.987 |
| Exceeding 40% of A-class turbulence, rotating speed is 0.74 $\omega_r$ and torque is 0.81 $T_r$ | 0.908 | 0.938 | 0.951 |
| Exceeding 60% of A-class turbulence, rotating speed is 0.68 $\omega_r$ and torque is 0.72 $T_r$ | 0.887 | 0.927 | 0.945 |

TABLE 2

Blade Root My Fatigue Load Comparison

| Blade root 1 My [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.954 | 0.926 | 0.891 |
| Exceeding 40% of A-class turbulence, rotating speed is 0.74 $\omega_r$ and torque is 0.81 $T_r$ | 0.858 | 0.879 | 0.864 |
| Exceeding 60% of A-class turbulence, rotating speed is 0.68 $\omega_r$ and torque is 0.72 $T_r$ | 0.905 | 0.971 | 0.99 |

TABLE 3

Blade Root Mz Fatigue Load Comparison

| Blade root 1 Mz [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.825 | 0.842 | 0.852 |
| Exceeding 40% of A-class turbulence, rotating speed is 0.74 $\omega_r$ and torque is 0.81 $T_r$ | 0.578 | 0.646 | 0.694 |
| Exceeding 60% of A-class turbulence, rotating speed is 0.68 $\omega_r$ and torque is 0.72 $T_r$ | 0.535 | 0.623 | 0.679 |

TABLE 4

Rotating Hub Coordinate System Mx Fatigue Load Comparison

| Rotating hub Mx [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.981 | 0.958 | 0.941 |
| Exceeding 40% of A-class turbulence, rotating speed is 0.74 $\omega_r$ and torque is 0.81 $T_r$ | 0.967 | 0.942 | 0.931 |
| Exceeding 60% of A-class turbulence, rotating speed is 0.68 $\omega_r$ and torque is 0.72 $T_r$ | 1.019 | 0.925 | 0.89 |

TABLE 5

Rotating Hub Coordinate System My Fatigue Load Comparison

| Rotating hub My [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.974 | 1.016 | 1.052 |
| Exceeding 40% of A-class turbulence, rotating speed is 0.74 $\omega_r$ and torque is 0.81 $T_r$ | 0.832 | 0.881 | 0.916 |
| Exceeding 60% of A-class turbulence, rotating speed is 0.68 $\omega_r$ and torque is 0.72 $T_r$ | 0.85 | 0.894 | 0.924 |

TABLE 6

Rotating Hub Coordinate System Mz Fatigue Load Comparison

| Rotating hub Mz [Nm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.996 | 1.039 | 1.072 |
| Exceeding 40% of A-class turbulence, rotating speed is 0.74 $\omega_r$ and torque is 0.81 $T_r$ | 0.833 | 0.895 | 0.938 |
| Exceeding 60% of A-class turbulence, rotating speed is 0.68 $\omega_r$ and torque is 0.72 $T_r$ | 0.872 | 0.927 | 0.959 |

TABLE 7

Stationary Hub Coordinate System Mx Fatigue Load Comparison

| Stationary hub Mx [MNm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.981 | 0.958 | 0.941 |
| Exceeding 40% of A-class turbulence, rotating speed is 0.74 $\omega_r$ and torque is 0.81 $T_r$ | 0.967 | 0.942 | 0.931 |
| Exceeding 60% of A-class turbulence, rotating speed is 0.68 $\omega_r$ and torque is 0.72 $T_r$ | 1.019 | 0.925 | 0.89 |

TABLE 8

Stationary Hub Coordinate System My Fatigue Load Comparison

| Stationary hub My [MNm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.989 | 0.999 | 0.996 |
| Exceeding 40% of A-class turbulence, rotating speed is 0.74 $\omega_r$ and torque is 0.81 $T_r$ | 0.873 | 0.879 | 0.87 |
| Exceeding 60% of A-class turbulence, rotating speed is 0.68 $\omega_r$ and torque is 0.72 $T_r$ | 0.937 | 0.953 | 0.95 |

TABLE 9

Stationary Hub Coordinate System Mz Fatigue Load Comparison

| Stationary hub Mz [MNm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 1.001 | 1.036 | 1.048 |
| Exceeding 40% of A-class turbulence, rotating speed is 0.74 $\omega_r$ and torque is 0.81 $T_r$ | 0.908 | 0.941 | 0.96 |
| Exceeding 60% of A-class turbulence, rotating speed is 0.68 $\omega_r$ and torque is 0.72 $T_r$ | 1.016 | 1.069 | 1.097 |

TABLE 10

Tower Footing My Fatigue Load Comparison

| Tower My, Tower station height = 1.14 m [MNm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.83 | 0.799 | 0.78 |
| Exceeding 40% of A-class turbulence, rotating speed is 0.74 $\omega_r$ and torque is 0.81 $T_r$ | 0.815 | 0.774 | 0.763 |
| Exceeding 60% of A-class turbulence, rotating speed is 0.68 $\omega_r$ and torque is 0.72 $T_r$ | 1.031 | 0.975 | 0.976 |

TABLE 11

Tower Footing Mz Fatigue Load Comparison

| Tower Mz, Tower station height = 1.14 m [MNm] | M = 4 | M = 7 Ratio | M = 10 |
|---|---|---|---|
| Standard A-class turbulence design fatigue load | 1 | 1 | 1 |
| Exceeding 20% of A-class turbulence, rotating speed is 0.9 $\omega_r$ and torque is 0.93 $T_r$ | 0.982 | 1.024 | 1.042 |
| Exceeding 40% of A-class turbulence, rotating speed is 0.74 $\omega_r$ and torque is 0.81 $T_r$ | 0.896 | 0.932 | 0.955 |
| Exceeding 60% of A-class turbulence, rotating speed is 0.68 $\omega_r$ and torque is 0.72 $T_r$ | 1.004 | 1.064 | 1.094 |

From the foregoing Table 1-11, it is apparent that, by applying technical solutions in the present disclosure, a fatigue load on a key or important component of a wind power generator set may satisfy standard design requirements under different degrees of over-standard turbulence intensity, and the power outputted by the wind power generator set may be maximized based on synthesizing all aspects of the fatigue load.

For the convenience of description, the system is described as units with various functions. Apparently, the functions of the units may be realized in a same or multiple software and/or hardware.

The embodiments of the disclosure are described in a progressive way, and each embodiment emphasizes the differences from other embodiments, and the same or similar contents of the embodiments may be referred to each other. Since the system disclosed by the embodiments corresponds to the method disclosed by the embodiments, the description of the system is brief, and for relevant matters references may be made to the description of the method. The description of apparatus and embodiments are merely exemplary. The units described as separate parts may or may not be physically separate, and parts displayed as units may or may not be physical units, may be located in one position, or may be distributed on multiple network units. Some or all of the units may be selected according to actual needs to achieve the objectives of the solutions in the embodiments. A person of ordinary skill in the art may understand and implement the embodiments of the present invention without creative efforts.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Steps of the method or algorithm described in conjunction with the embodiments disclosed herein may be implemented directly with hardware, a software module executed by a processor, or a combination thereof. The software module may be placed in a Random Access Memory (RAM), a memory, a Read Only Memory (ROM), an electrically-programmable ROM, an electrically erasable programmable ROM, a register, a hard disk, a removable disk, a CD-ROM, or a storage medium in any other forms well known in the art.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A control method of a wind power generator set, comprising:

acquiring a wind speed at a location of the wind power generator set, calculating turbulence intensity according to the wind speed, and determining a wind speed distribution range corresponding to the turbulence intensity;

determining a thrust variation amplitude of thrust in the wind speed distribution range based on a relationship among the thrust suffered by a wind wheel of the wind power generator set, a thrust coefficient and the wind speed;

wherein the step of acquiring a wind speed at a location of the wind power generator set, calculating turbulence intensity according to the wind speed, and determining a wind speed distribution range corresponding to the turbulence intensity comprises:

acquiring a wind speed at the location of the wind power generator set in a preset period, and calculating an average wind speed $\bar{v}$ in the preset period;

calculating the turbulence intensity $$I = \frac{\delta}{\bar{v}} = \frac{\sqrt{\frac{1}{N}\sum_{i=1}^{N}(v_i - \bar{v})^2}}{\bar{v}}$$

according to the average wind speed $\bar{v}$, and determining a Gaussian distribution $$f(v) = \frac{1}{\delta\sqrt{2\pi}} e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i - \bar{v})^2}}{\bar{v}};$$

and determining the wind speed distribution range ($\bar{v}-1.96\delta$, $\bar{v}+1.96\delta$) according to the theory of small probability event and the Gaussian distribution $$f(v) = \frac{1}{\delta\sqrt{2\pi}} e^{-\frac{(v-\bar{v})^2}{2\delta^2}},$$

where turbulence intensity I corresponds to the average wind speed $\bar{v}$, $v_i$ denotes an instantaneous wind speed of the i-th sampling point, and N denotes the number of sampling points in the preset period, and adjusting a maximum rotating speed and a maximum torque of the wind wheel in the wind speed distribution range according to the thrust variation amplitude, wherein the maximum rotating speed and the maximum torque makes a fatigue load of the wind power generator set in the wind speed distribution range meet a preset standard; and running the wind power generator set according to the maximum rotating speed and the maximum torque of the wind wheel in the wind speed distribution range.

2. The control method according to claim 1, wherein the step of determining a thrust variation amplitude of the thrust in the wind speed distribution range based on a relationship among the thrust suffered by a wind wheel of the wind power generator set, a thrust coefficient and the wind speed comprises:

determining a relation $$F = \frac{1}{2}\rho A v^2 C_t\left(\beta, \frac{\omega R}{v}\right)$$

among the thrust, a pitch angle $\beta$ of a blade of the wind wheel and a wind wheel rotating speed $\omega$ according to a relation $F=\frac{1}{2}\rho A v^2 C_t(\beta,\lambda)$ among the thrust suffered by the wind wheel of the wind power generator set, the thrust coefficient and the wind speed and according to a tip speed ratio $$\lambda = \frac{\omega R}{v}$$

of the wind wheel;

determining a minimum thrust $$F_{min-I} = \frac{1}{2}\rho A v_{min}^2 C_t\left(\beta_{opt}, \frac{\omega_{low}R}{v_{min}}\right)$$

corresponding to a minimum wind speed $v_{min}=\bar{v}-1.96\delta$ in the wind speed distribution range and a maximum thrust $$F_{max-I} = \frac{1}{2}\rho A v_{max}^2 C_t\left(\beta_{opt}, \frac{\omega_{high}R}{v_{max}}\right)$$

corresponding to a maximum wind speed $v_{max}=\bar{v}+1.96\delta$ in the wind speed distribution range according to the formula $$F = \frac{1}{2}\rho A v^2 C_t\left(\beta, \frac{\omega R}{v}\right);$$

and
determining a thrust variation amplitude $$F_I = \frac{\sqrt{\frac{((F_{max-I} - F_{\bar{v}})^2 + (F_{min-I} - F_{\bar{v}})^2)}{2}}}{F_{\bar{v}}}$$

of the thrust in the wind speed distribution range according to the minimum thrust, the maximum thrust and a relation between the thrust and the wind speed $$F = \frac{\sqrt{\frac{1}{N}\sum_{i=1}^{N}(F_{v_i} - F_{\bar{v}})^2}}{F_{\bar{v}}},$$

where $\rho$ is an air density, A is a wind wheel swept area, v is a wind speed, $C_t(\beta,\lambda)$ is the thrust coefficient relevant to the pitch angle $\beta$ of the blade of the wind wheel and the tip speed ratio $\lambda$, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_t$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

3. The control method according to claim 2, wherein the step of adjusting a maximum rotating speed and a maximum torque of the wind wheel in the wind speed distribution range according to the thrust variation amplitude comprises:
adjusting the maximum rotating speed $\omega_{high}$ of the wind power generator set in the wind speed distribution range according to $$F_{I_2} = \frac{\sqrt{\frac{((F_{max-I_2} - F'_{\bar{v}})^2 + (F_{min-I_2} - F'_{\bar{v}})^2)}{2}}}{F'_{\bar{v}}} = \frac{\sqrt{\frac{((F_{max-I_1} - F_{\bar{v}})^2 + (F_{min-I_2} - F'_{\bar{v}})^2)}{2}}}{F_{\bar{v}}} = F_{I_1}$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed; and
adjusting a maximum torque $T_{max-I_2} = T_{max-I_1} - T_{min-I_1} + T_{min-I_2}$ of the wind power generator set in the wind speed distribution range according to $T_{I_1} = T_{max-I_1} - T_{min-I_1} = T_{max-I_2} - T_{min-I_2} = T_{I_2}$ when the turbulence intensity increases from $I_1$ to $I_2$ and the torque variation amplitude $T_I$ of the wind power generator set changes from $(T_{min-I_1}, T_{max-I_1})$ to $(T_{min-I_2}, T_{max-I_2})$ due to variation of the wind speed, where $F'_{\bar{v}}$ is thrust corresponding to the maximum rotating speed.

4. The control method according to claim 1, further comprising:
restricting the maximum torque according to a power generation system characteristic curve of the wind power generator set.

5. A control apparatus of a wind power generator set, comprising a processor and a non-transitory storage medium having a plurality of instructions stored thereon that, when executed by the processor, cause the processor to:
acquire a wind speed at a location of the wind power generator set, calculate turbulence intensity according to the wind speed, and determine a wind speed distribution range corresponding to the turbulence intensity;
determine a thrust variation amplitude of the thrust in the wind speed distribution range based on a relationship among the thrust suffered by a wind wheel of the wind power generator set, a thrust coefficient and the wind speed;
wherein the acquiring a wind speed at a location of the wind power generator set, calculating turbulence intensity according to the wind speed and determining a wind speed distribution range corresponding to the turbulence intensity comprises:
acquiring a wind speed at the location of the wind power generator set in a preset period, and calculating an average wind speed $\bar{v}$ in the preset period;
calculating the turbulence intensity $$I = \frac{\delta}{\bar{v}} = \frac{\sqrt{\frac{1}{N}\sum_{i=1}^{N}(v_i - \bar{v})^2}}{\bar{v}}$$

according to the average wind speed $\bar{v}$, and determining a Gaussian distribution $$f(v) = \frac{1}{\delta\sqrt{2\pi}}e^{-\frac{(v-\bar{v})^2}{2\delta^2}},$$

with a center of $\bar{v}$ and a standard deviation of $$\delta = \sqrt{\frac{1}{N}\sum_{i=1}^{N}(v_i - \bar{v})^2},$$

of a wind speed distribution range corresponding to the turbulence intensity according to the turbulence intensity $$I = \frac{\delta}{\bar{v}} = \frac{\sqrt{\frac{1}{N}\sum_{i=1}^{N}(v_i - \bar{v})^2}}{\bar{v}};$$

and
determining the wind speed distribution range ($\bar{v}-1.96\delta$, $\bar{v}+1.96\delta$) according to the theory of small probability event and the Gaussian distribution $$f(v) = \frac{1}{\delta\sqrt{2\pi}} e^{-\frac{(v-\bar{v})^2}{2\delta^2}},$$

where turbulence intensity I corresponds to the average wind speed $\bar{v}$, $v_i$ denotes an instantaneous wind speed of the i-th sampling point, and N denotes the number of sampling points in the preset period, and adjust a maximum rotating speed and a maximum torque of the wind wheel in the wind speed distribution range according to the thrust variation amplitude, wherein the maximum rotating speed and the maximum torque makes a fatigue load of the wind power generator set in the wind speed distribution range meet a preset standard; and run the wind power generator set according to the maximum rotating speed and the maximum torque of the wind wheel in the wind speed distribution range.

6. The control apparatus according to claim 5, wherein the determining a thrust variation amplitude of the thrust in the wind speed distribution range based on a relationship among the thrust suffered by a wind wheel of the wind power generator set, a thrust coefficient and the wind speed comprises:

determining a relation $$F = \frac{1}{2}\rho A v^2 C_t\left(\beta, \frac{\omega R}{v}\right)$$

among the thrust, a pitch angle β of a blade of a wind wheel and a wind wheel rotating speed ω according to a relation $F=\frac{1}{2}\rho A v^2 C_t(\beta,\lambda)$ among the thrust suffered by the wind wheel of the wind power generator set, the thrust coefficient and the wind speed and according to a tip speed ratio $$\lambda = \frac{\omega R}{v}$$

of the wind wheel;

determining a minimum thrust $$F_{min-1} = \frac{1}{2}\rho A v_{min}^2 C_t\left(\beta_{opt}, \frac{\omega_{low} R}{v_{min}}\right)$$

corresponding to a minimum wind speed $v_{min}=\bar{v}-1.96\delta$ in the wind speed distribution range and a maximum thrust $$F_{max-1} = \frac{1}{2}\rho A v_{max}^2 C_t\left(\beta_{opt}, \frac{\omega_{high} R}{v_{max}}\right)$$

corresponding to a maximum wind speed $v_{max}=\bar{v}+1.96\delta$ in the wind speed distribution range according to the formula $$F = \frac{1}{2}\rho A v^2 C_t\left(\beta, \frac{\omega R}{v}\right);$$

and determining a thrust variation amplitude $$F_I = \frac{\sqrt{\frac{((F_{max-1}-F_{\bar{v}})^2+(F_{min-1}-F'_{\bar{v}})^2)}{2}}}{F_{\bar{v}}}$$

of the thrust in the wind speed distribution range according to the minimum thrust, the maximum thrust and a relation between the thrust and the wind speed $$F = \frac{\sqrt{\frac{1}{N}\sum_{i=1}^{N}(F_{v_i}-F_{\bar{v}})^2}}{F_{\bar{v}}},$$

where ρ is an air density, A is a wind wheel swept area, v is a wind speed, $C_t(\beta,\lambda)$ is the thrust coefficient relevant to the pitch angle β of the blade of the wind wheel and the tip speed ratio λ, R is a wind wheel radius, $\omega_{min}$ is a minimum rotating speed of the wind power generator set in grid connection, $\omega_{low}$ is a minimum rotating speed of the wind power generator set, $\omega_{high}$ is a maximum rotating speed of the wind power generator set, $\beta_{opt}$ is an optimum pitch angle, $F_{\bar{v}}$ is thrust suffered at the average wind speed $\bar{v}$, $F_I$ is a thrust variation amplitude during the preset time at the average wind speed $\bar{v}$ and at the turbulence intensity I, and $F_{v_i}$ is thrust suffered by the wind wheel at the i-th sampling point with an instantaneous wind speed of $v_i$.

7. The control apparatus according to claim 6, wherein the adjusting a maximum rotating speed and a maximum torque of the wind wheel in the wind speed distribution range according to the thrust variation amplitude comprises:

adjusting a maximum rotating speed $\omega_{high}$ of the wind power generator set in the wind speed distribution range according to $$F_{I_2} = \frac{\sqrt{\frac{((F_{max-I_2}-F'_{\bar{v}})^2+(F_{min-I_2}-F'_{\bar{v}})^2)}{2}}}{F'_{\bar{v}}} = \frac{\sqrt{\frac{((F_{max-I_1}-F_{\bar{v}})^2+(F_{min-I_2}-F'_{\bar{v}})^2)}{2}}}{F_{\bar{v}}} = F_{I_1}$$

when the turbulence intensity increases from $I_1$ to $I_2$ and the thrust variation amplitude changes from $(F_{min-I_1}, F_{max-I_1})$ to $(F_{min-I_2}, F_{max-I_2})$ due to variation of the wind speed; and adjusting a maximum torque $T_{max-I_2}=T_{max-I_1}-T_{min-I_1}+T_{min-I_2}$ of the wind power generator set in the wind speed distribution range according to $T_{I_1}=T_{max-I_1}-T_{min-I_1}=T_{max-I_2}-T_{min-I_2}=T_{I_2}$ when the turbulence intensity increases from $I_1$ to $I_2$ and the torque variation amplitude $T_I$ of the wind power generator set changes from $(T_{min-I_1}, T_{max-I_1})$ to $(T_{min-I_2}, T_{max-I_2})$ due to variation of the wind speed, where $F_{\bar{v}}'$ is thrust corresponding to the maximum rotating speed.

8. The control apparatus according to claim 5, wherein the apparatus further comprises instructions that cause the processor to:

restrict the maximum torque according to a power generation system characteristic curve of the wind power generator set.

* * * * *